United States Patent [19]
Hermening et al.

[11] Patent Number: 5,501,316
[45] Date of Patent: Mar. 26, 1996

[54] ROUTING APPARATUS FOR A TRAIN OF CONTAINERS OF GLASS OR THE LIKE

[75] Inventors: Heinz Hermening, Porta Wetfalica; Siegfried Schwarzer, Stöckse; Hans-Georg Seidel, Rinteln, all of Germany

[73] Assignee: The firm Hermann Heye, Opernkirchen, Germany

[21] Appl. No.: 256,008

[22] PCT Filed: Sep. 9, 1993

[86] PCT No.: PCT/EP93/02434

§ 371 Date: Jun. 17, 1994

§ 102(e) Date: Jun. 17, 1994

[87] PCT Pub. No.: WO94/08879

PCT Pub. Date: Apr. 28, 1994

[30] Foreign Application Priority Data

Oct. 20, 1992 [DE] Germany .............. 42 35 369.6

[51] Int. Cl.⁶ .................................................. B65G 47/26
[52] U.S. Cl. ........................................ 198/457; 198/459.1
[58] Field of Search ........................ 198/459.1, 459.2, 198/457, 459.8, 462.1, 462.3, 475.1, 483.1

[56] References Cited

U.S. PATENT DOCUMENTS

| | | | |
|---|---|---|---|
| 3,193,076 | 7/1965 | Creed | 198/459.1 |
| 3,701,407 | 10/1972 | Kulig | 198/457 |
| 4,411,353 | 10/1983 | McDole . | |
| 4,776,448 | 10/1988 | Kulig | 198/457 X |
| 5,277,296 | 1/1994 | Roberts et al. | 198/457 |

FOREIGN PATENT DOCUMENTS

| | | |
|---|---|---|
| 2002150 | 9/1970 | Germany . |
| 2508275 | 9/1976 | Germany . |
| 2548988 | 9/1976 | Germany . |
| 2752193 | 6/1979 | Germany . |
| 3340088 | 8/1985 | Germany . |
| 3426713 | 1/1986 | Germany . |
| 3811394 | 8/1989 | Germany . |

Primary Examiner—James R. Bidwell
Attorney, Agent, or Firm—Gary A. Hecht

[57] ABSTRACT

Containers (2) arrive on a first conveyor belt (3) at comparatively large initial spacings (8) from one another and at comparatively high speed in a first direction of movement (4). The containers (2) are routed on a continuously curved path (11) into a second direction of movement (5) onto a second conveyor belt (6). Between the conveyor belts (3, 6) is arranged an intermediate belt (14) whose upper run (15) is driven in a third direction of movement (16) with a lower speed than the first conveyor belt (3). The second conveyor belt (6) likewise runs at lower speed than the first conveyor belt (3), so that finally a comparatively small second gap (7) results between the containers (2). A drive member (10) carries on the one hand transportation fingers (9) which engage between successive containers (2), and on the other hand stopping members (13) of a support device (12) with which the containers (2) are kept in continuous contact up to their delivery on to the second conveyor belt (6). A working section (31) of the drive member (10) is automatically guided in accordance with the continuously curved path (11).

33 Claims, 13 Drawing Sheets

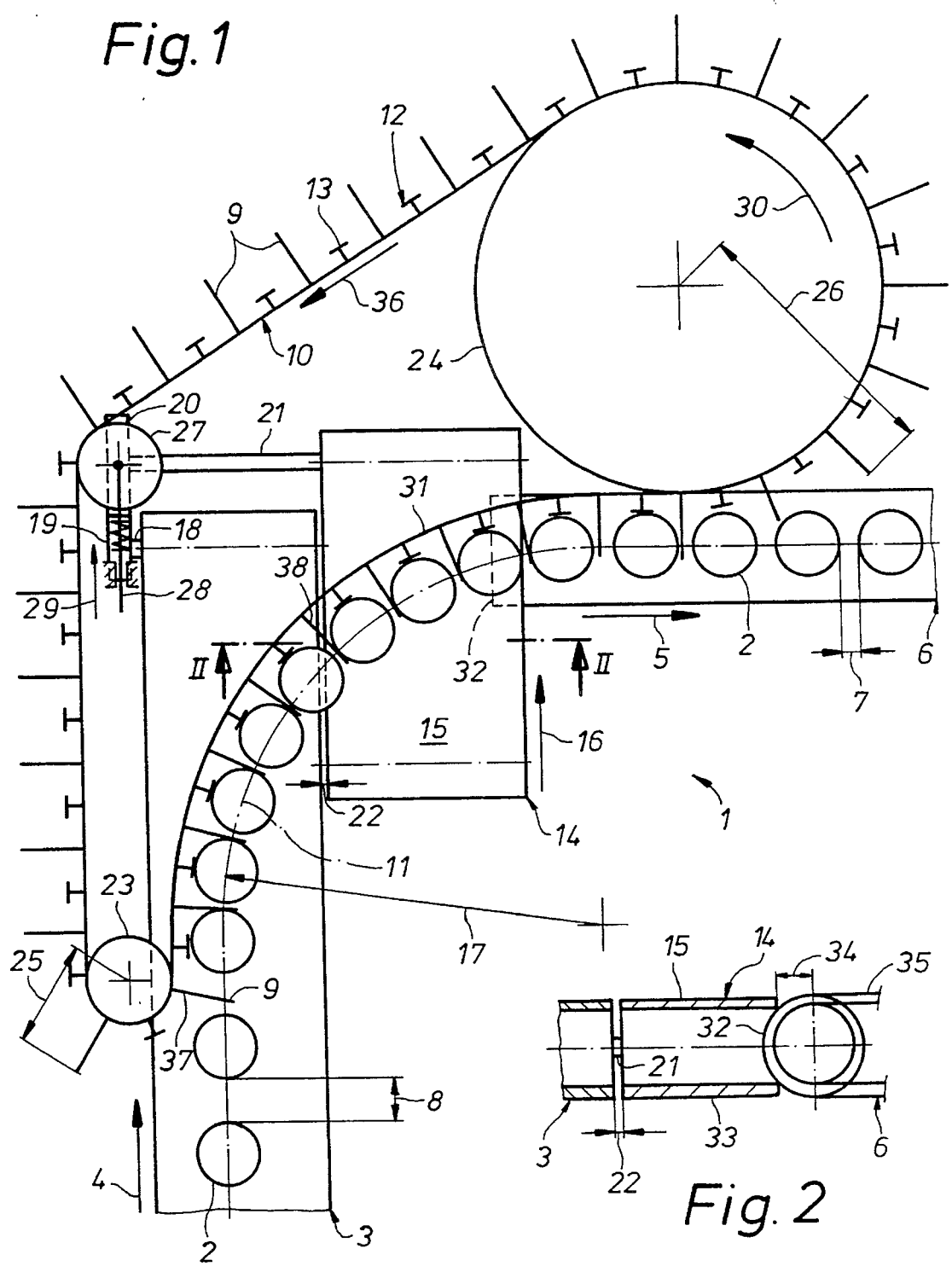

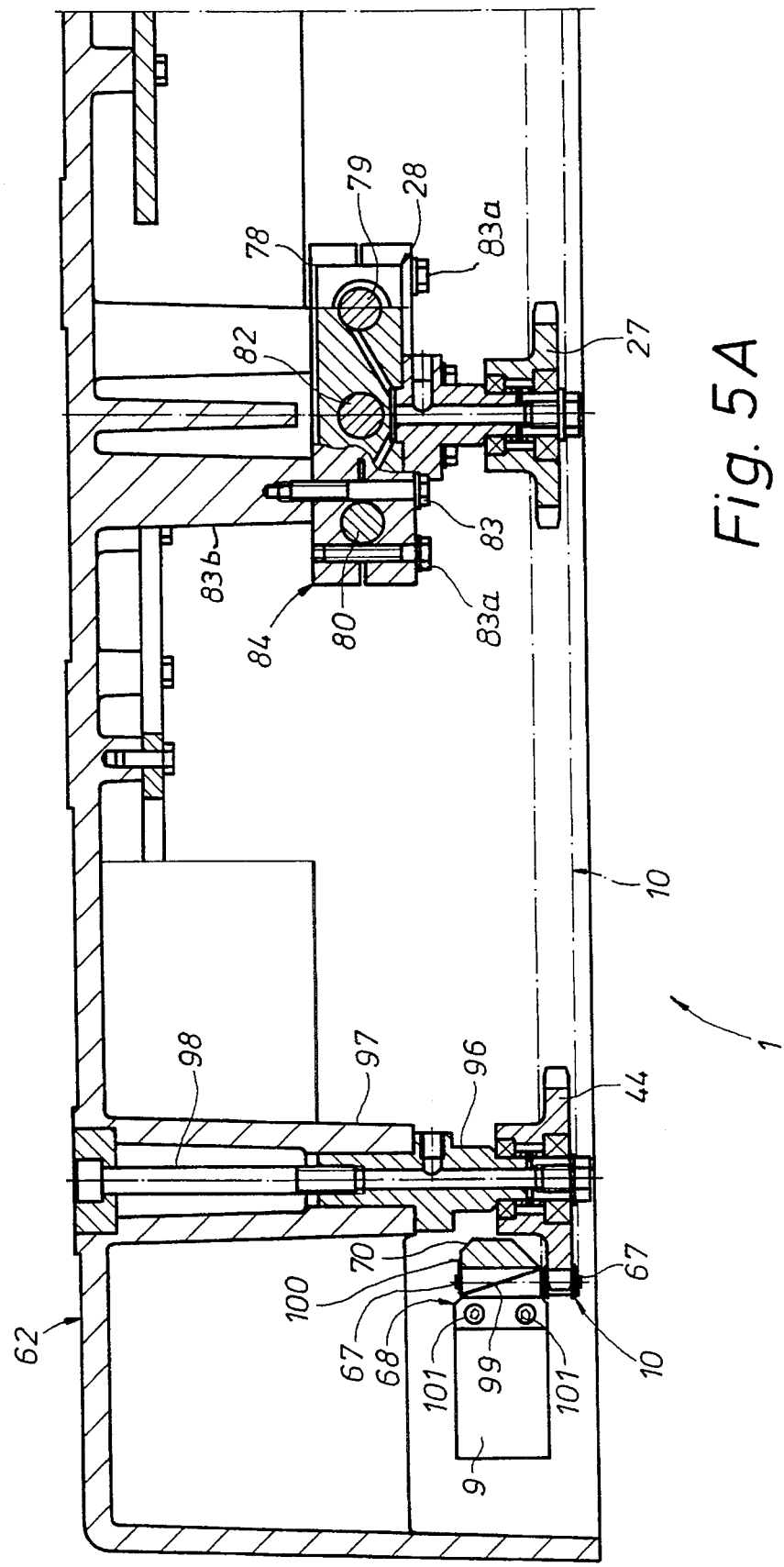

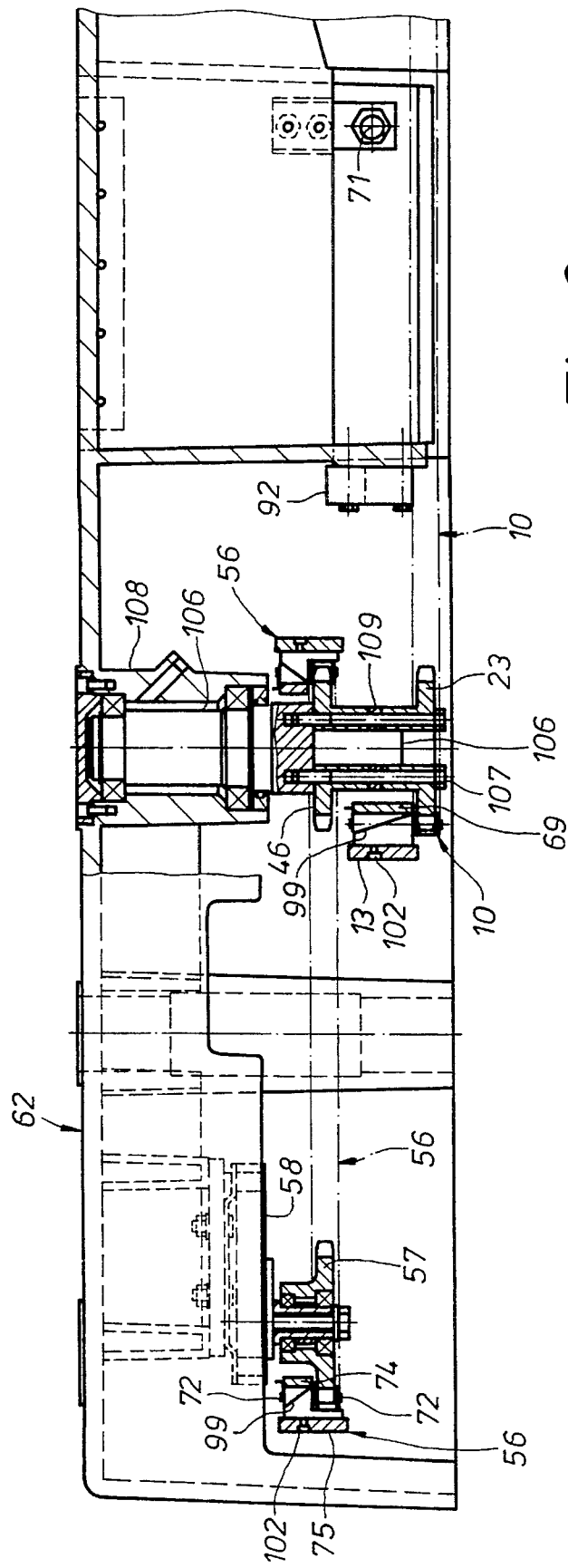

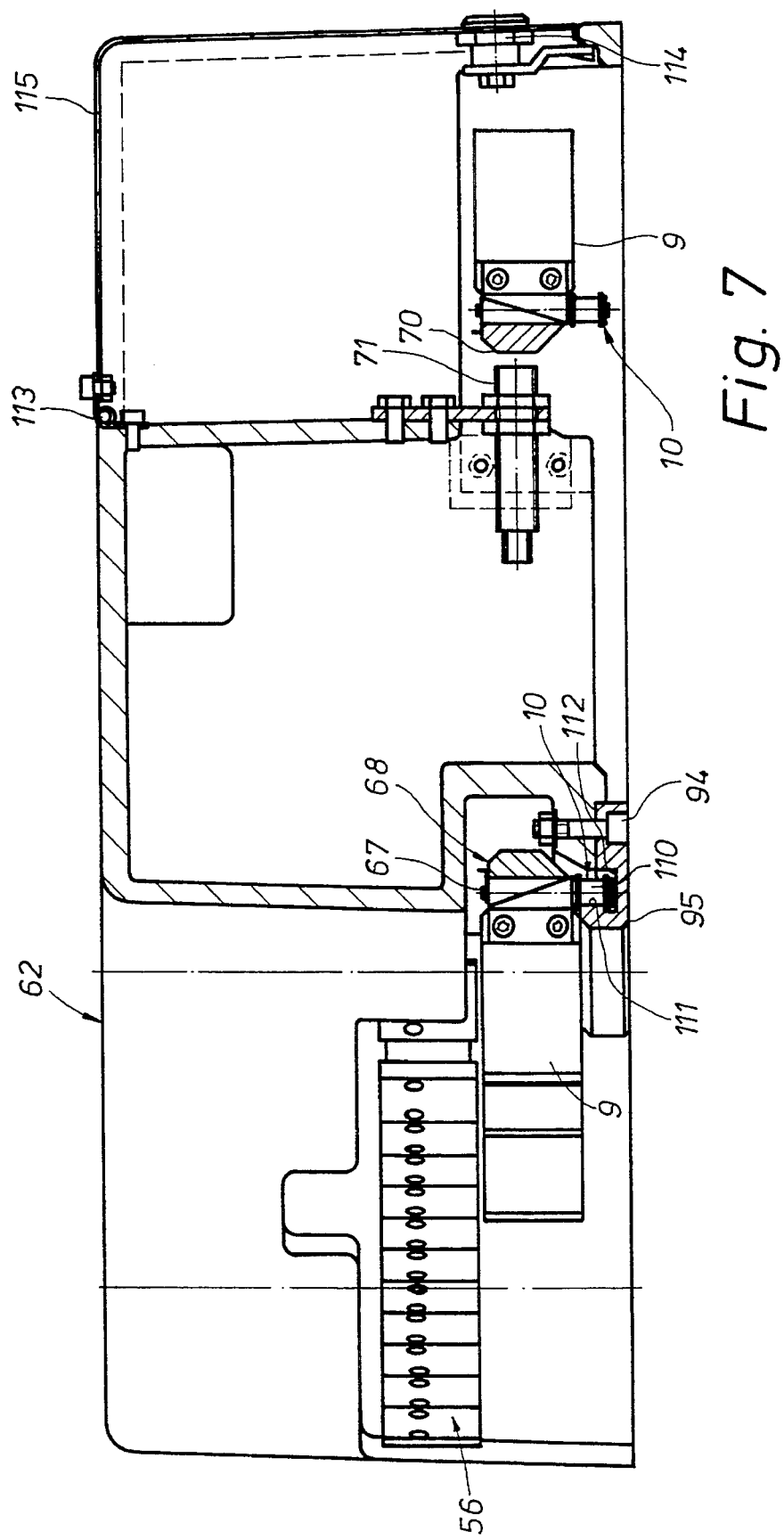

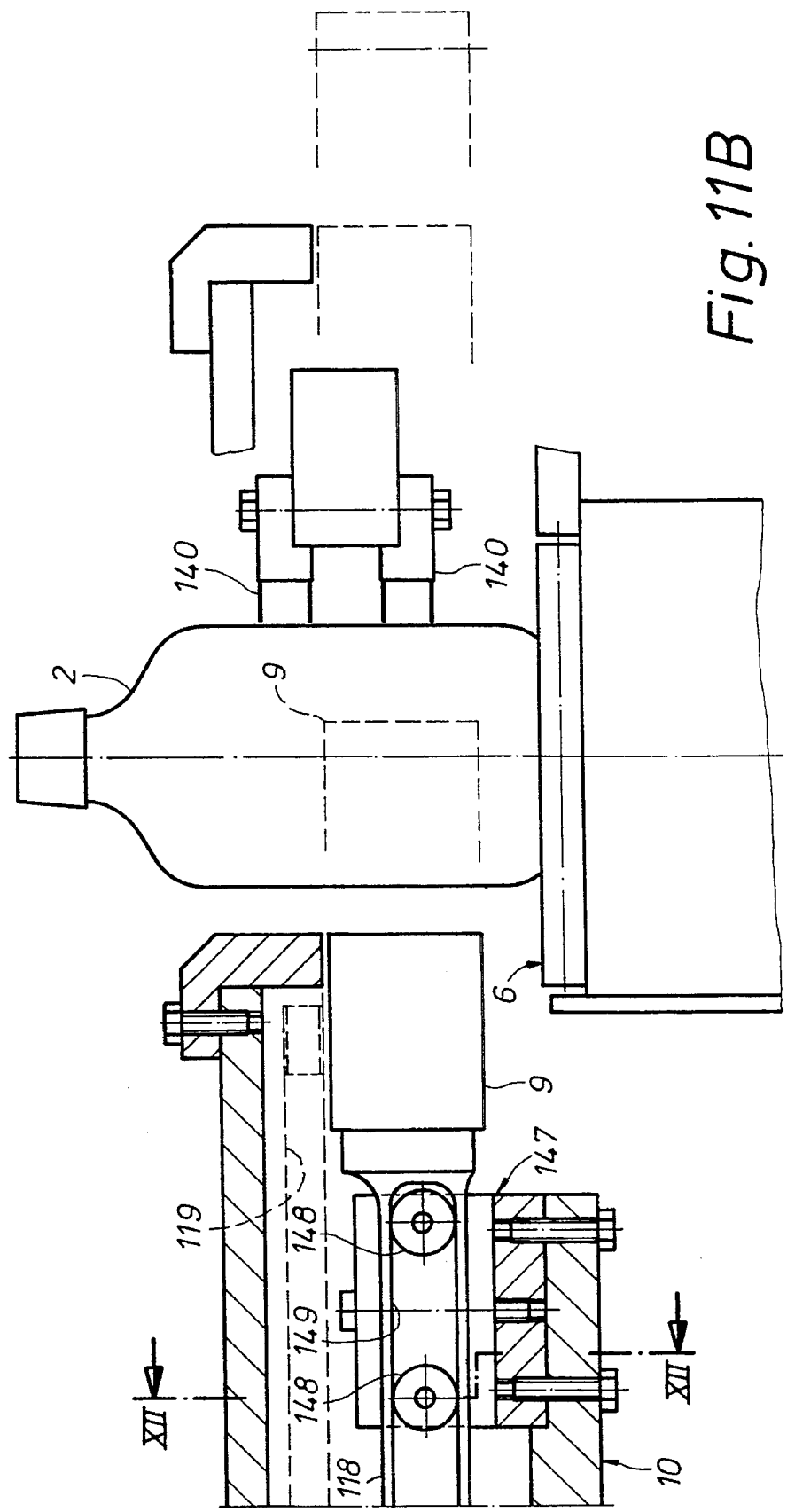

ROUTING APPARATUS FOR A TRAIN OF CONTAINERS OF GLASS OR THE LIKE

BACKGROUND OF THE INVENTION

1. Field of the Invention

The invention relates to apparatus for routing containers of glass, glass-like material or plastics material from one conveyor belt to another. More particularly, the invention pertains to apparatus for routing items arriving on a first conveyor belt in a row at a comparatively high first speed to a second conveyor belt running at a lower second speed and at an angle to the first conveyor belt. The second conveyor belt carries away the containers in a row.

Transportation fingers arranged in and moved by a common drive member route each container from the first to the second conveyor belt. In the routing of the containers, the transportation fingers are guided on a continuously curved path which is concave with reference to the containers. Support means is provided to maintain each container on the continuously curved path.

2. Description of Related Art

In one known apparatus of this type (transfer apparatus type WT 650 of the company Ernst Pennekamp, Hölker Feld 22, W-5600 Wuppertal 2, Germany) the drive member is formed as an endless chain whose working section is pushed by a driving chain wheel. Each transportation finger is connected fixedly with a stopping member of the support means to an L-shaped component. Each said component is connected to the chain by a trailing arm for pivotal movement about a vertical axis, with the arm having at its free end a curve roller arranged to run in a stationary curved track. The transportation fingers, by special shaping of the curved track, should pivot inwards into the container train at the input to the first conveyor belt and in the same way should pivot outwards out of contact with the containers after the delivery of the containers to the second conveyor belt. At the delivery end the chain is guided by means of a deflection chain wheel whose axis is adjustable for tensioning the chain in the direction of the second conveyor belt. Between the first and the second conveyor belts is mounted a stationary slide plate for the containers. The chain is driven at least approximately at the lower, second speed of the second conveyor belt. It is disadvantageous that each container, at least on the slide plate, is not located in a defined, reproducible position against its transportation finger and the associated stopping member. Thus, it cannot be guaranteed that the containers will reach the second conveyor belt in a uniform row and in constant distances from each other. Moreover, the periodic pivoting of the transportation fingers increases the cost and leads to wear.

In the customary way, a glass forming machine delivers newly formed containers to the first conveyor belt. For technical reasons, the containers are positioned on the first conveyor belt at a comparatively large distance from one another. The first conveyor belt runs at a comparatively high speed. Under these conditions, introduction of the containers into the subsequent annealing lehr can be problematic. It is therefore customary to route the train of containers from the first conveyor belt on to a second conveyor belt which runs at an angle of mostly 90° thereto.

The second conveyor belt runs at a lower speed, so that the containers on the second conveyor belt are positioned at a smaller distance from each other. The containers are pushed into the annealing lehr from the second conveyor belt by a stacker which is known per se and which can handle a greater number of containers simultaneously. To permit the pushing movement to be performed in an orderly yet rapid manner without the risk of upsetting the containers, the spacing between the containers on the second conveyor belt should be alike and as small as possible. Moreover, the containers on the second conveyor belt should be arranged in a straight line as far as possible.

Previously known devices for routing the containers from the first to the second conveyor belt impart shocks to the containers. The transportation fingers of the devices circulate essentially at the lower speed of the second conveyor belt. This has the result that each container on the first conveyor belt initially runs against the trailing side of a transportation finger and in the later course of the routing movement is given a second shock by the leading edge of the subsequent transportation finger which then takes over the further transportation of the container. Moreover, as mentioned above, the redirecting is connected with a change of direction of the containers through mostly 90°. Depending upon the type and shape of the containers, this leads to substantial or fairly substantial transverse and tilting forces which cause a lack of stability for the containers. Thus, during the routing movement and even shortly after this on the second conveyor belt, wobbling movements, rotational movements and swaying movements of the containers can be observed on the second conveyor belt. This has an overall negative effect on an orderly routing to and on the desired positioning of the containers on the second conveyor belt.

An apparatus of the type first mentioned above is also known from the published German patent application DE-OLS 2 002 150 and U.S. Pat. No. 4,411,353A. In both cases the drive member is formed as a roller chain. In DE-OLS 2 002 150 the roller chain is tensioned by a pressure plate pretensioned by tension springs, and the roller chain is arranged to slide along the pressure plate. In both cases a stationary slide plate is again arranged between the first conveyor belt and the second conveyor belt. The disadvantages are the same as in the case of the known apparatus first discussed above.

From DE 25 48 988 C3 and DE 27 52 193 A1 it is known to position a weighing belt between a supply belt and a delivery belt. The weighing belt runs at least approximately parallel to the active section of a belt-like routing device.

From DE G 91 14 766.2 U1 it is known to transfer stacks of print from one conveying track to another conveying track which is arranged at 90° thereto while maintaining their orientation. This is accomplished by an inclined conveyor track having a plurality of conveyor belts extending parallel to one another.

From U.S. Pat. No. 3,470,998 A there is known an apparatus where the longitudinal movement of timber on a supply conveyor moving at high speed is changed into a transverse movement on a slower delivery conveyor which is arranged transversely thereto. A laterally movable slow-down conveyor brings the timber from the supply conveyor to the delivery conveyor.

From the German patent application published for opposition DE 1 296 576 it is known to provide mechanical delay members in conveyor belt installations with a branching off or angled routing with a small radius between the incoming conveyor belt and the outgoing conveyor belt where these delay members entrain the conveyed goods during the routing operation with a speed which is reduced as compared to that of the conveyor belts.

From DE 33 40 088 A1 there is known an apparatus for the pressure-less reshaping of a broad multi-channel flow of bottles into a single channel stream of bottles. Suppliers and deliverers extend at 90° to each other. Parallel to the delivery belt and adjacent to it are arranged conveyor belts of an intermediate conveyor driven with decreasing speed. The intermediate conveyor is inclined downwards towards the output conveyor in order to achieve a transportation component for the bottles which is transverse to the direction of delivery.

From DE 25 08 275 A1 it is known to arrange a routing end of a delivery conveyor between a lower run and an upper run of a supply conveyor.

From DE 34 26 713 C2 is known an apparatus for the channeling out of bottles transported on a linear conveyor belt. Next to the conveyor belt is arranged a circulating driven carrier with individually actuatable strikers. Each striker is radially displaceable when it is coupled to a stationary curved guide. By this means bottles which are faulty are displaced onto an adjacent belt which is parallel to the conveyor belt.

From DE 38 11 394 A1 there is known an apparatus by means of which the distance between containers which are moved in a row can be changed. A hub is rotatably drivable and forms a slide guide for spokes. Each spoke on its outer side carries an entrainer which is guided by a guide so that its radial distance from the hub changes periodically during its circulation.

SUMMARY OF THE INVENTION

It is the object of the invention to reduce the shock-like loads on the containers during the routing movement and to improve the positioning of the containers on the second conveyor belt so that they are positioned as best possible similar distances apart from each other and in a line which is straight and uniform.

This object is achieved by providing at least one intermediate belt which takes control of each container along a part of the continuously curved path and which is arranged in the continuously curved path between the first conveyor belt and the second conveyor belt. An upper run of each intermediate belt is arranged to be at least approximately co-planar with upper runs of the first conveyor belt and the second conveyor belt and is drivable in such a direction that a driving component in the direction of the drive member is imparted to the containers on the or each intermediate belt.

The intermediate belt produces the desired driving component in the direction of the drive member, particularly by frictional entrainment of the containers. By the arrangement of the intermediate belt the "turning radius" is increased in the desired way. This leads first of all to a gentler routing of the containers with significantly reduced tilting and wobbling movements. By means of the driving component in the direction of the drive member, the containers are additionally held in defined, optimum positions relative to the routing apparatus. In particular, this prevents the possibility of the containers rotating out of following transportation fingers during the routing movement in the manner which has often been observed up to now. Such containers either fail to reach the second conveyor belt or else they are positioned incorrectly on the second conveyor belt. A further advantage achieved by the invention is that, with modern high speed glass forming machines, even with the highest conveyor belt speeds, a smooth routing of the containers can be achieved in a trouble-free manner and in the sense of the demands of the stacker.

The features of claim 2 lead to a particularly smooth routing of the containers. These measures are recommended, for example, with containers having comparatively low stability.

By means of the features of claim 3 the driving costs can be reduced and the synchronisation of the intermediate belts with the conveyor belts can be facilitated.

According to claim 4, the undesired slide plates between intermediate belts are completely avoided. This serves to improve the travel of the containers.

The same applies to the features of claim 5.

According to claim 6, the feeding of the containers to the transportation fingers of the drive member is improved. This feature has a favorable effect on the undisturbed travel of the containers during the routing movement. The first centering member can be formed for example as a thermally insulating chain or belt.

According to claim 7, the speed of the first centering member can be adjustable if necessary. The drive can be derived from the drive member.

The features of claim 8 also serve to improve the routing of the containers.

The arrangement according to claim 9 is particularly favorable both for accommodating the intermediate belt and also for driving said at least one intermediate belt.

The features of claim 10 give constructional, structural and operational advantages.

According to claim 11, the drive member is pulled, rather than pushed, in a particularly favorable manner in the region of the continuously curved path. This improves the travel during the routing movement both of the drive member and also of its transportation fingers.

The features of claim 12 favorably affect the introduction of the transportation fingers between successive containers on the first conveyor belt.

The features of claim 13 bring about the particular advantage that the working section of the drive member which brings about the routing movement is not changed overall in its geometrical dimensions, above all in its effective length, during the change of the tension of the drive member.

The features of claim 14 lead to a particularly favorable removal of the transportation fingers from the spaces between successive containers on the second conveyor belt. The diameter of the rearward deflection wheel can be for example 5 to 7 times greater than the diameter of the forward deflection wheel.

The features of claim 15 likewise facilitate the removal of the transportation fingers from successive containers on the second conveyor belt. Moreover, it is advantageous if the support means is in contact for as short a time as possible with the containers which are still comparatively hot and not normalized.

The features of claim 16 ensure, as needed, an aligned orientation of the containers in a row on a predetermined line on the second conveyor belt.

According to claim 17, the drive for the second centering member is derived from the rearward deflection wheel. In this case the driving member runs at a specific angle to the direction of movement of the second conveyor belt. Because of this angle, when the drive is taken from the same shaft, the speed of the out-running section of the transportation member is smaller than the speed of the second conveyor belt.

According to claim 18, the support means functions in a particularly simple and effective manner. An example of a drive member in this case is a roller chain whose bolts are extended on one or both sides and can serve for the coupling of the stopping members. The stopping members can be equipped with a thermal insulating layer contacting the containers. In this way thermally negative influences on the containers can be minimized.

The arrangement according to claim 19 brings about advantages from the point of view of space and driving techniques.

With the features of claim 20 the transportation fingers can be introduced in a particularly trouble-free manner between successive containers and can be removed again from the spaces between successive containers.

The features according to claim 21 are constructionally simple and functionally reliable.

According to claim 22, the outward and inward movements of the transportation fingers can be effected in a simple manner.

The features of claim 23 characterize a particularly simple embodiment from the structural point of view.

According to claim 24 a particularly smooth routing of the containers can be realized. An elliptical curved member can be used for example as the curved member.

The drive member according to claim 25 can be a roller chain for example.

The structure according to claim 26 is structurally particularly simple and can be used with advantage if by means of said at least one intermediate belt a drive component acts on the containers which tends to free or actually frees the containers from the support means.

The features of claim 27 serve essentially to ensure against the fact that the containers might move inwards in an undesirable manner. Preferably, the advancing effect of the intermediate belt or belts is such that a defined, very light contact of the containers on the outside with the support means is created, while a small distance remains relative to the inner support means. The advancing effect of the intermediate belt can be done such that the containers finally contact neither the outer nor the inner support means but are still delivered to the second conveyor belt in a straight line with constant spacing from each other.

The structure according to claim 28 is particularly advantageous.

Also, the structure according to claim 29 is comparatively simple but yet functionally reliable.

According to claim 30, favorable constructional and structural conditions result.

According to claim 31, the transportation fingers can move for example with a speed which is about 2% lower than the speed of movement of the second conveyor belt. Each container runs for example initially against the trailing side of the transportation finger and is then transferred to and further advanced by the leading edge of the subsequent transportation finger after leaving the first conveyor belt, up to the delivery of the container to the second conveyor belt where the container is freed from its transportation finger.

According to claim 32 and 33, one has a particularly well defined guidance of the drive member or of the drive elements. If these are formed as roller chains, the roller chains can be supported at least at the sides on their rollers and possibly also below on their bolts against the stationary curved track.

Further features and advantages of the invention will now be described with reference to the embodiments which are given by way of example and which are illustrated in the drawings.

BRIEF DESCRIPTION OF THE DRAWINGS

FIG. 1 is a schematic plan view of a first embodiment of the apparatus;

FIG. 2 shows a part of the sectional view taken along the line II—II in FIG. 1;

FIGS. 5A and 5B, which represent an extension of one from the other in the lateral direction, show the sectional view taken along the line V—V in FIGS. 4A and 4B, on an enlarged scale;

FIG. 6 is the sectional view taken along the line VI—VI in FIG. 4B, on an enlarged scale;

FIG. 7 is the sectional view taken along the line VII—VII in FIG. 4B, on an enlarged scale;

FIGS. 11A and 11B are lateral extensions one of the other and show the sectional view taken along the line XI—XI in FIG. 10, on an enlarged scale.

DETAILED DESCRIPTION

Figure 3:
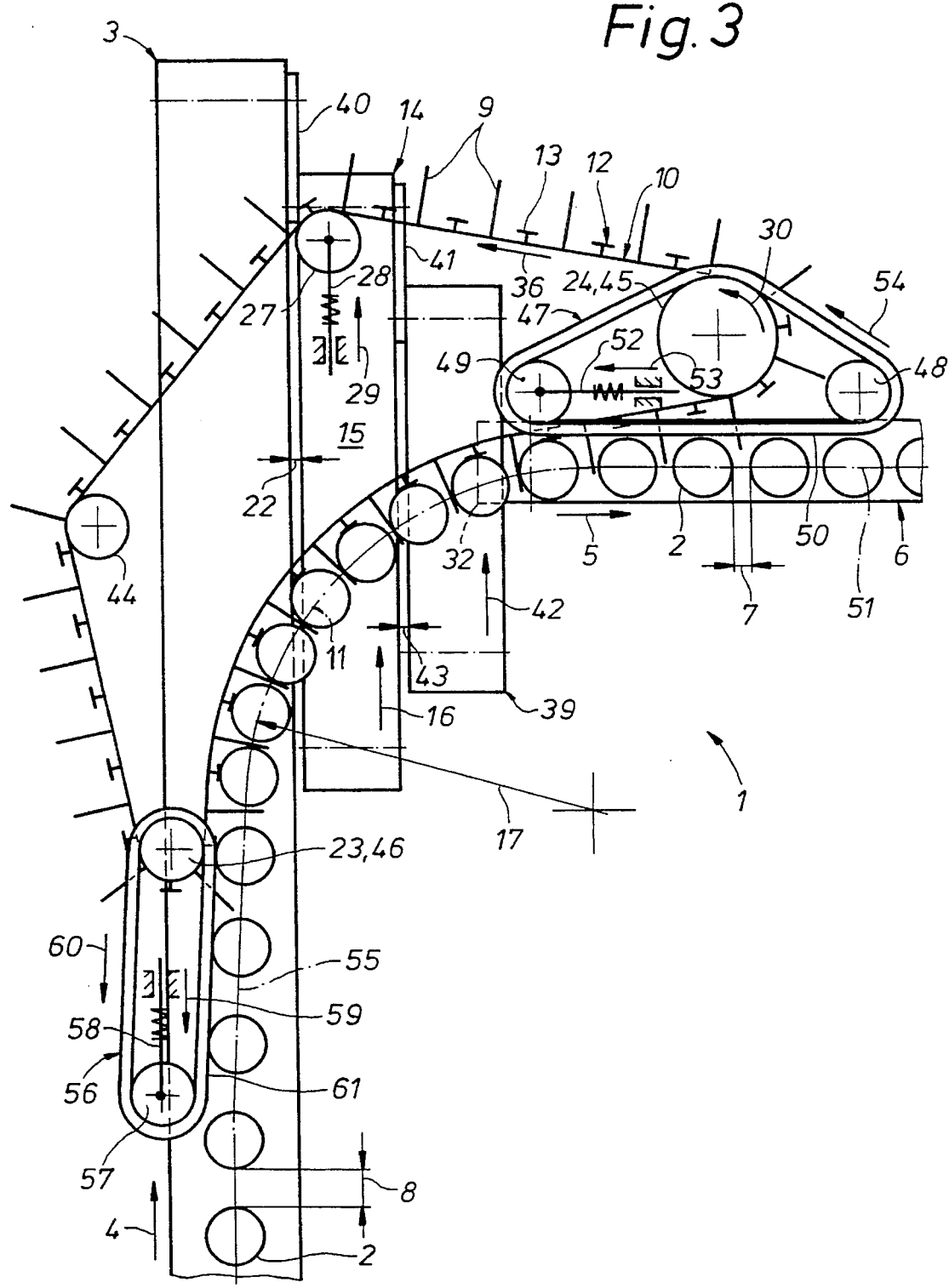
FIG. 3 is a schematic plan view of a second embodiment of the apparatus.

FIG. 1 shows an apparatus 1 for the routing of containers 2 which arrived on a first conveyor belt 3 in a first direction of movement 4 in a row at a comparatively high first speed. In the embodiment which is given by way of example, the containers are of glass and have just left a glass forming machine which is not shown. The containers 2 still have a comparatively high temperature at this point in time.

The containers 2 are routed by the apparatus 1 to a second conveyor belt 6 running at a lesser, second speed in a second direction of movement 5. In the ideal case which the present invention seeks to achieve, the containers 2 on the second conveyor belt are set in a straight line and have the same size, second separation 7 from one another, which, because of the difference in the belt speeds, is smaller than the first separation 8 from one another which is the spacing for the containers 2 when located on the first conveyor belt 3.

For the routing, each container 2 has a transportation finger 9 associated therewith. All the transportation fingers 9 are arranged on a common drive member 10 which moves the transportation fingers 9. Preferably, the drive member 10 is formed as a roller chain with pins lengthened on one side, as will be described in more detail hereinafter.

The transportation fingers 9 are guided from the first conveyor belt 3 up to the second conveyor belt 6 on a continuously curved path 11 which is concave with respect to the containers 2. In order that the longitudinal axes of the containers 2 shall move in the desired way along the continuously curved path 11, a support device 12 is provided. In the embodiment shown in FIG. 1, the support device 12 comprises a stopping member 13 for each container 2 and which is fixed to the drive member 10. One is provided between successive transportation fingers 9. Preferably, the regions of the transportation fingers 9 and of the stopping members 13 which come into contact with the containers 2 are manufactured from a non-metallic material which is wear resistant and which acts as a good heat barrier, in order to avoid undesired local chilling of the containers 2. As a rule, the containers 2 are fed by the second conveyor belt 6 into an annealing lehr in which the containers 2 are tempered in a stress-free manner. Nevertheless, one should avoid the aforementioned local chilling of the still hot containers 2 by components of the apparatus 1.

An intermediate belt 14 which accepts each container 2 is arranged in the continuously curved path 11, as shown in FIG. 1, between the first conveyor belt 3 and the second conveyor belt 6. The intermediate belt 14 extends parallel to the first conveyor belt 3. An upper run 15 of the intermediate belt 14 is driven at a third speed in a third direction of movement 16 which is parallel to the first direction of movement 4. The third speed of the intermediate belt 14 is less than the first speed of the first conveyor belt 3 and needs only to be sufficiently large that a drive component in the direction of the drive member 10 is created for the containers 2 on the intermediate belt 14 by frictional entrainment at the base of the containers 2, with this drive component being just sufficient to maintain the containers 2 in soft contact with the stopping members 13. This drive component acts to ensure in particular that the containers 2, during the routing, cannot rotate towards the inside in an uncontrolled manner out of and away from the adjacent transportation fingers.

In the case of FIG. 1, the continuously curved path 11 is represented as part of an arc of a circle having a radius 17. Thanks to the intermediate provision of the intermediate belt 14 the radius 17 can be significantly greater than in the case of the known routing apparatuses. This leads to a gentler routing and directional change for the containers 2 from the first conveyor belt 3 to the second conveyor belt 6, which in the case of FIG. 1 amounts to 90°.

On a drive shaft 18 of the first conveyor belt 3 is fixed a gearwheel 19 which meshes with a larger gearwheel 20 which is fixed on a drive shaft 21 of the intermediate belt 14. Thus, the drive of the intermediate belt 14 can be derived from that of the first conveyor belt 3.

A gap 22 between the first conveyor belt 3 and the intermediate belt 14 is dimensioned to be so small that the containers 2 can be transferred from the first conveyor belt to the intermediate belt 14 without being disturbed by the apparatus 1.

At an input end of the continuously curved path 11 is located a forward deflection wheel 23 of the smallest possible diameter for the drive member 10. Correspondingly, at a delivery end of the continuously curved path 11 there is provided a rearward deflection wheel 24 for the drive member 10. In the embodiment shown in FIG. 1 the diameter of the rearward deflection wheel 24 is many times greater than the diameter of the forward deflection wheel 23. In FIG. 1 this ratio signifies the indicated radial distances 25 and 26 of the free ends of the transportation fingers 9 from the centres of the deflection wheels 23 and 24. At the side of the drive member 10 which is remote from the containers 2 there is arranged as shown in FIG. 1 an intermediate deflection wheel 27 which is tensioned by means of a chain tensioner 28 in the direction of the arrow 29 against the drive member 10. In this way the optimum tension is always maintained in the drive member 10.

It is of particular advantage that it is not the forward deflection wheel 23 but the rearward deflection wheel 24 which is rotationally drivable in the direction of the arrow 30. This gives the special advantage that a working section 31 of the drive member guided along the continuously curved path 11 is no longer pushed but is pulled. This leads to a more uniform running of the working section 31 with defined spacing of the transportation fingers 9 and the stopping members 13 from one another.

As shown in FIGS. 1 and 2, a deflected end 32 of the second conveyor belt 6 extends between upper run 15 and lower run 33 of the adjacent intermediate belt 14 running at an angle of 90° thereto. In this way one has an arrangement in which a gap 34 between the upper run 15 and an upper run 35 of the second conveyor belt 6 is kept to a minimum.

The apparatus 1 shown in FIG. 1 functions as follows:

The drive member 10 is driven in the direction of the arrow 36 at a speed which is somewhat smaller than the second speed of the second conveyor belt 6. This has the result that each container 2 on the first conveyor belt 3 initially impinges against the trailing side 37 of one of the transportation fingers 9 and remains in contact with this trailing side and with the associated stopping member 13 until the container 2 has more or less reached the intermediate belt 14. Since the intermediate belt 14 moves with a lesser speed than the first conveyor belt 3, each container 2 in turn comes into contact with a leading side 38 of the following transportation finger 9, while its contact with the associated stopping member 13 is maintained. Each container 2 maintains this two-point contact until it is brought to the second conveyor belt 6 and is released by its somewhat greater speed from the leading side 38 of the associated transportation finger. From this moment on the containers 2 should no longer have any possibility of being contacted by any transportation finger. Successive containers then have the desired spacing 7 from each other.

At the beginning of the deflection of the drive member 10 by the rearward deflection wheel 24 the containers 2 also are freed from their stopping members 13. This has the result that all containers 2 on the second conveyor belt 6 are in a straight row, as is intended.

In all the Figures of the drawings the same or equivalent parts are provided with the same respective reference numerals.

In the embodiment shown in FIG. 3, a further intermediate belt 39 is arranged parallel to the intermediate belt 14.

Just as in FIG. 1, again in FIG. 3 the intermediate belt 14 is driven by means of a gear unit 40 in the third direction of movement 16 at a lower speed than the first conveyor belt 3. By means of a further gear unit 41 the drive for the further intermediate belt 39 is derived from the intermediate belt 14, and indeed in such a manner that the further intermediate belt 39 moves in a fourth direction of movement 42 parallel to the third direction of movement 16 but more slowly than the intermediate belt 14. A gap 43 between the intermediate belts 14 and 39 can be kept sufficiently small that it is bridged over by the containers 2 without difficulty.

As shown in FIG. 3, a further intermediate deflection wheel 44 is provided besides the intermediate deflection wheel 27. The rearward deflection wheel 24 in FIG. 3 lies below a deflection wheel 45 which is fixedly connected therewith. The rearward deflection wheel 24 has a significantly smaller diameter than the rearward deflection wheel 24 in FIG. 1. In a similar manner, in FIG. 3, above the forward deflection wheel 23 is arranged a deflection wheel 46 which is fixedly connected therewith.

At the beginning of the deflection of the drive member 10 by the rearward deflection wheel 24, in contrast to FIG. 1, in FIG. 3 the stopping members 13 of the support device 12 are already located at a distance from the containers 2. This facilitates the trouble-free withdrawal movement of the transportation fingers from between successive containers 2. In order to prevent the possibility that because of this the containers 2 might no longer be in a straight predetermined line 51 on the second conveyor belt 6, there is provided in this region an endless, flexible second centering member 47. The second centering member 47 can be formed for example as a roller chain with stopping members mounted on it, corresponding to the design of the drive member 10. Alternatively, however, it could be a belt or band which at least on its side facing the containers 2 consists of a non-metallic heat-resisting material. The second centering member 47 is guided initially around the rotationally driven deflection wheel 45 and also around deflection wheels 48 and 49. A working section 50 of the second centering member 47 contacts the containers 2 and centres them on the predetermined straight line 51 on the second conveyor belt 6. A chain tensioner 52 exerts a tension force in the direction of the arrow 53 on the deflection wheel 49 and consequently on the second centering member 47. The second centering member 47 is driven at least approximately at the speed of movement of the second conveyor belt 6, so that the containers 2 are only supported by the working section 50 and are not entrained by it, while the second centering member 47 circulates in the direction of the arrow 54.

In order to center the containers 2 which are arriving on the first conveyor belt 3 on a line 55 which is predetermined by the transportation fingers 9 for the acceptance of the containers 2, there is provided according to FIG. 3, at the forward end of the drive member 10, an endless, flexible first centering member 56. The first centering member 56 is guided on the one hand around the rotationally driven deflection wheel 46 and on the other hand by a deflection wheel 57 which is positioned further forward. The deflection wheel 57 is subjected to the first of a chain tensioner 58 such that a tension force is exerted in the direction of the arrow 59 on the first centering member 56. The first centering member 56 can be constructed in different ways, just like the second centering member 47. It runs in the direction of the arrow 60 and has a working section 61 parallel to the predetermined line 55 of the containers 2. In this way the containers 2 are fed to the transportation fingers 9 in a positionally more correct manner.

Figure 4A:
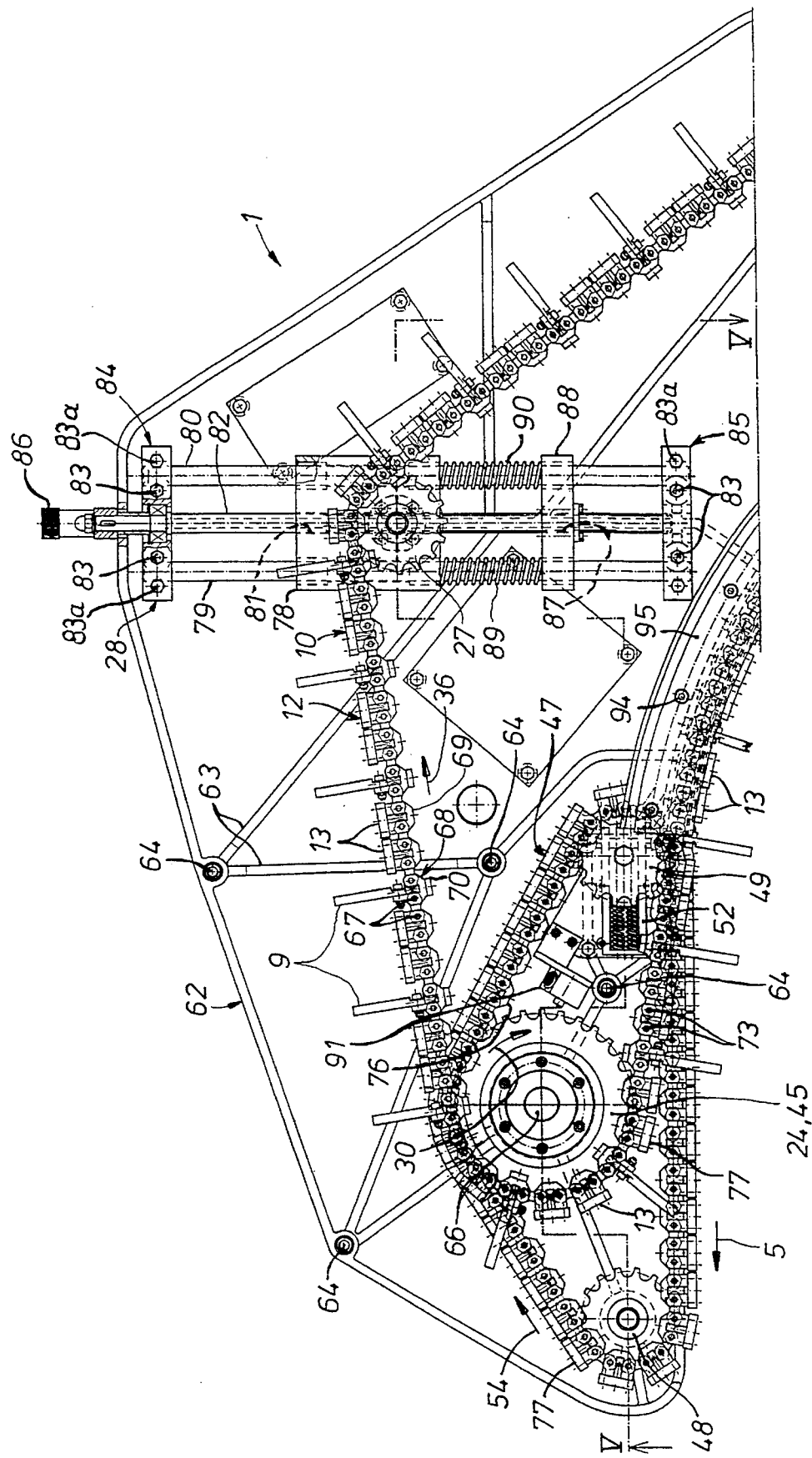
FIGS. 4A and 4B show in two parts, to be conjoined vertically, a view from below of an apparatus according to the principles of the apparatus according to FIG. 3, with details and on an enlarged scale.
Figure 4B:
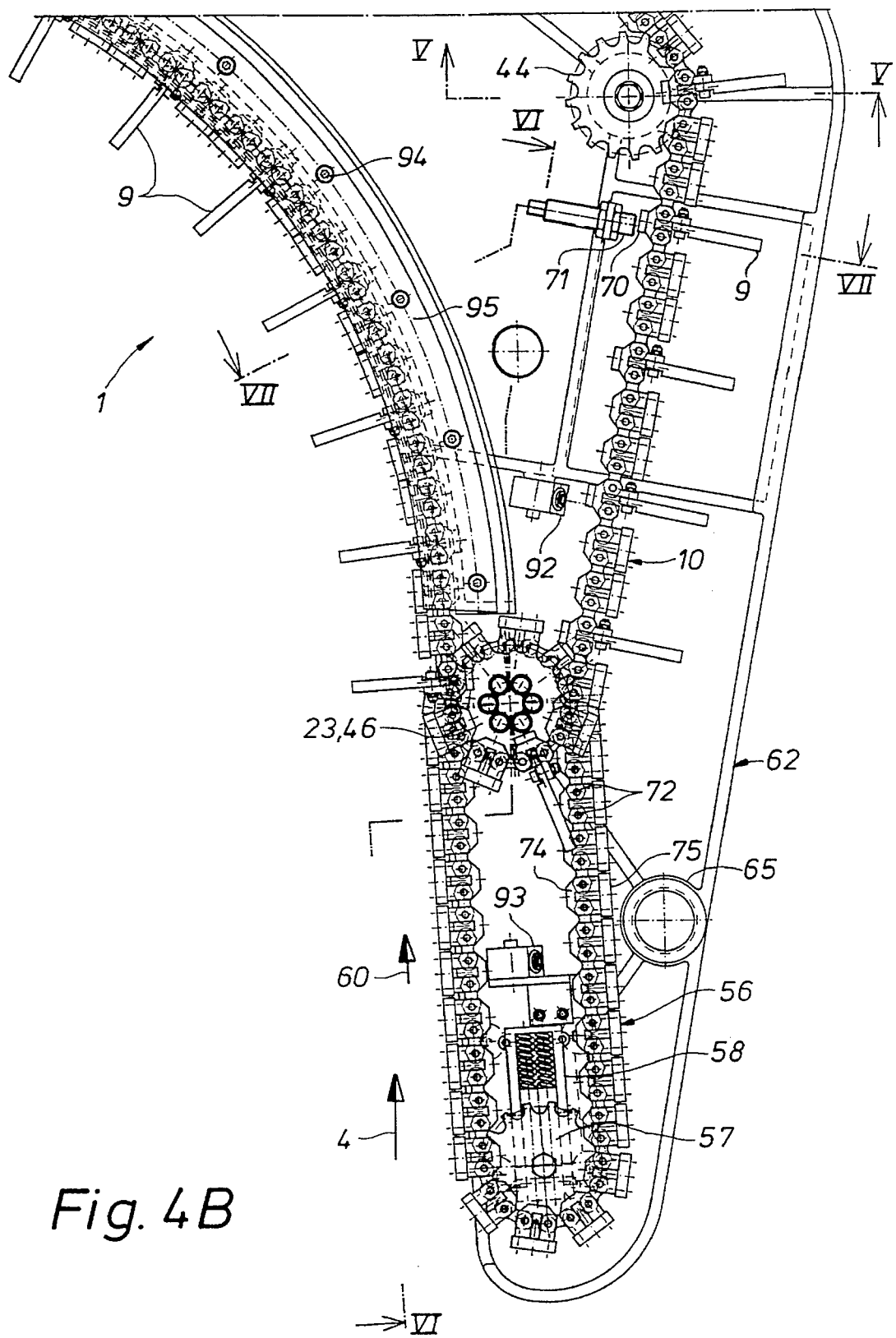

FIGS. 4A and 4B show an apparatus 1 according to the principle of the apparatus 1 shown in FIG. 3, but viewed from below. In FIGS. 4A and 4B, however, numerous details are shown which are omitted from FIG. 3 for reasons of clarity.

In FIGS. 4A and 4B the apparatus 1 is embedded in a stable housing 62 which is provided with powerful internal reinforcement struts 63. At node points of the reinforcement struts 63 one can see from FIG. 4A that centering and threaded bores 64 are provided into which bolts which are not shown can be inserted, by means of which the apparatus 1 is fixed to a driving and regulating unit which is known per se and which is not shown. Apart from these fixing points the apparatus 1 is otherwise self-supporting. In special cases, however, a further supporting of the apparatus 1 could be provided for by means of a support eyelet 65 of the housing 62 such as is illustrated in FIG. 4B.

In FIG. 4A one can see a drive shaft 66 which is concentric with respect to the deflection wheels 24 and 45 and which can be coupled to the aforesaid driving and regulating unit for the rotary driving of the deflection wheels 24 and 45.

In FIGS. 4A and 4B the drive member 10 is formed as a roller chain whose bolts 67 are all extended upwards. On every pair of adjacent extensions of the bolts 67 is mounted either a holder 68 for one of the transportation fingers 9 or a base member 69 of one of the stopping members 13, and these parts are secured in the axial direction in a manner which will be described later. The holders 68 and the base members 69 are preferably made of aluminum in order to keep the mass of the drive member 10 low. In contrast to the base members 69, each holder 68 includes a rearward extension 70 which serves to actuate a proximity detector 71 (FIG. 4B) on the housing 62. The proximity detector 71 is connected to an electronic control in a manner which is not shown, and the drives for the first conveyor belt and for the second conveyor belt 6 are connected inter alia to the electronic control. The proximity detector 71 generates a pulse upon each passage of one of the rearward extensions 70 and thus of one of the transportation fingers 9, so that the control knows the instantaneous position of all the transportation fingers relative to the conveyor belts 3, 6.

In the embodiment according to FIGS. 4A and 4B, two stopping members 13 are provided between successive transportation fingers 9, in contrast to FIG. 3. If containers 2 (FIG. 3) of smaller diameter are to be transported, then by simple replugging of the transportation fingers 9 and of the stopping members 13 one can arrange that only one stopping member 13 is located between successive transportation fingers 9. Correspondingly, in the case of containers 2 of larger diameter, more than two stopping members 13 may be mounted between successive transportation fingers 9. Also, as necessary, the transportation fingers 9 can be exchanged for shorter or longer transportation fingers 9 by simple, rapid replugging.

In FIGS. 4B and 4A the first centering member 56 and the second centering member 47 are likewise formed as roller chains whose bolts 72 and 73 respectively are extended upwards. On every pair of adjacent extensions of the bolts 72 a base member 74 is fitted and axially secured as shown in FIG. 4B. On each base member 74 is screwed on the outside a stopping member 75 of non-metallic material which is good in terms of heat resistance.

In the same way, on every pair of adjacent extensions of the bolts 73 there is fitted a base member 76, as shown in FIG. 4A, to which is screwed on the outside a stopping member 77 of non-metallic material which has good heat resistance.

According to FIG. 4A, the chain tensioner 28 comprises a carriage 78 on which the intermediate deflection wheel 27 is rotatably mounted. The carriage 78 is guided for free displacement on guide rails 79 and 80 and further includes a throughbore 81 which receives a central screw spindle 82 with universal play. The guide rails 79, 80 are fixed to lugs 84 and 85 on the housing 62 by means of clamping screws 83a. The lugs 84, 85 are fixed by means of fastening screws 83 to pillars 83b (FIG. 5A) of the housing 62. The screw spindle 82 is rotatably mounted in the lugs 84, 85 and is fixed in the lug 84 in the axial direction. The screw spindle 82 can be rotated from the outside of the housing 62 by means of a rotatable knob 86. An internal thread 87 of a traverse 88 is in meshing engagement with an external thread of the screw spindle 82. The traverse is freely displaceable on the guide rails 79, 80. Between the carriage 78 and the traverse 88 are located compression springs 89 and 90 on the guide rails 79, 80 and which urge the carriage 78 and consequently the intermediate deflection wheel 27 in the direction of the drive member 10, and consequently obviate the need for a comparatively frequent adjustment of the rotatable knob 86.

In FIGS. 4A and 4B are shown stationary spray nozzles 91, 92 and 93 which make it possible to carry out a controlled automatic lubrication of the second centering member 47, of the drive member 10 and of the first centering member 56 with lubricant.

From FIGS. 4A and 4B it can also be appreciated that at the underside of the housing 62 a stationary curved track 95 is secured by screws 94, by which track the transportation fingers 9 are guided by means of the drive member 10 on the continuously curved path 11 (FIG. 3). Details of this will be described later with reference to FIG. 7.

Figure 5B:
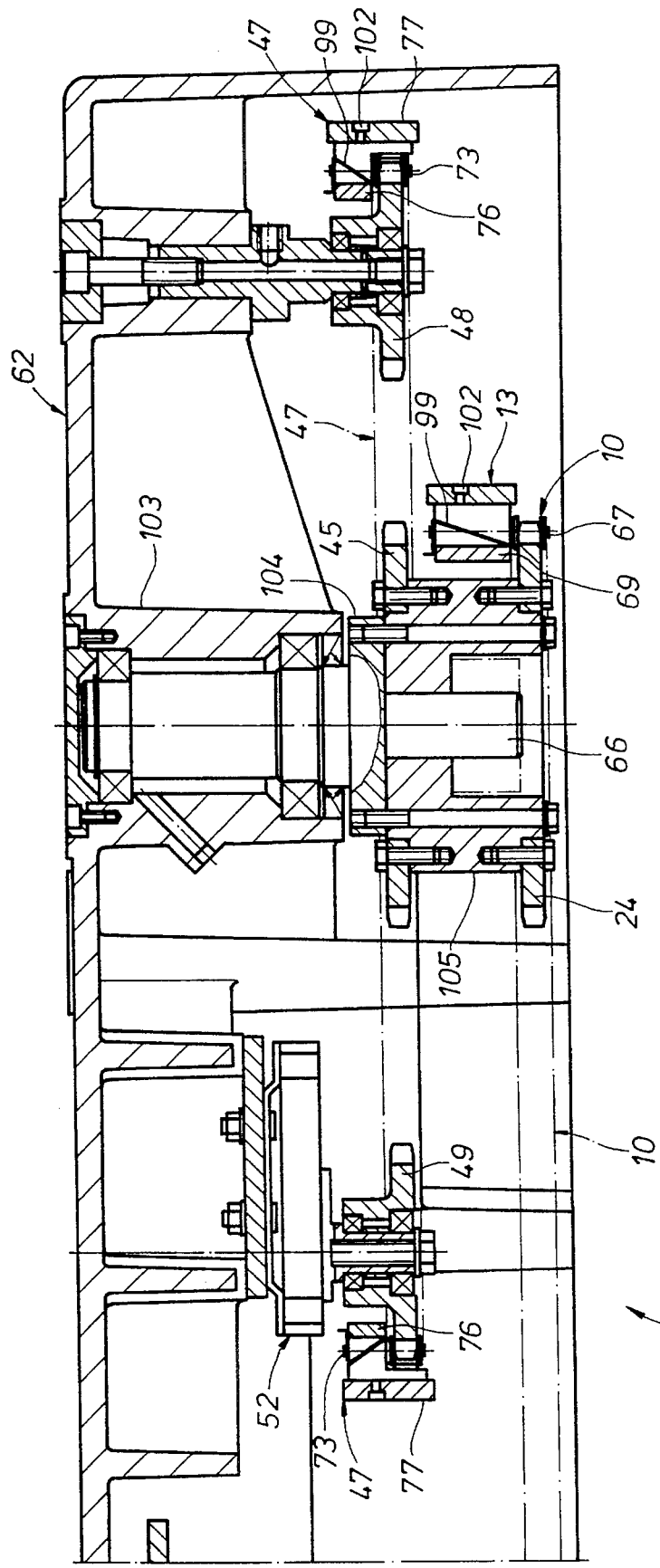

FIGS. 5A and 5B show further details. Thus, in FIG. 5A, the further intermediate deflection wheel 44 is rotatably mounted on a plug spindle 96 which is fitted into a shaft 97 of the housing 92 and is secured there by means of a screw 98.

The upward extension of each bolt 67 is provided in the region of its upper end with a circumferential groove in which engages, in the normal position, the narrow region of a keyhole-shaped aperture in a Z-shaped securing spring 99. Consequently, the holder 68 is fixed in the axial direction on the bolt 67. In order to raise the holder 68 from the bolt 67 it is then only necessary to displace a higher end 100 of the securing spring 99 in FIG. 5A to the left until the further part of the keyhole-shaped hole in the securing spring 99 permits a passage of the bolt 67. The mounting of the holder 68 can likewise be effected rapidly and easily in the reverse sense. The transportation finger 9 is releasably secured to the holder 68 by two screws 101.

Equivalent securing springs 99 serve, as shown in FIG. 5B, also for the axial fixing of the base members 69 on the bolts 67 and of the base members 76 on the bolts 73.

FIG. 5B makes it clear how the stopping members 13, 77 are each releasably fixed by screws 102 to the associated base members 69, 76.

As shown in FIG. 5B, the drive shaft 66 is rotatably mounted in a bearing support 103 of the housing 62. By means of a flange 104 on the drive shaft 66 a boss 105 is screwed on, to which are screwed at opposite ends the deflection wheels 24, 45 which are formed as equal size chain wheel rings.

As shown in FIG. 6, the deflection wheels 23, 46 formed as equal chain wheels are fitted on a shaft 106 and are fixed thereon by screws 107. The shaft 106 is freely rotatably mounted in a bearing support 108 of the housing 62. A spacer ring 109 is introduced between the deflection wheels 23, 46.

From FIG. 7 one can appreciate the function of the stationary curved track 95. Rollers 110 of the drive member 10 which is formed as a roller chain are supported and guided in the horizontal direction by a curved surface 111 of the curved track 95. Additionally, as needed, the lower end of the bolts 67 can be supported and slidingly guided on a horizontal curved surface 112 of the curved track 95. This results overall in a very exact guidance of the drive member 10 along the continuously curved path 11 (FIG. 3).

By means of a hinge 113 a flap 115 which is lockable by a lock 114 is hingedly connected to the housing 62 and permits access to the proximity detector 71 from the outside.

Figure 8:
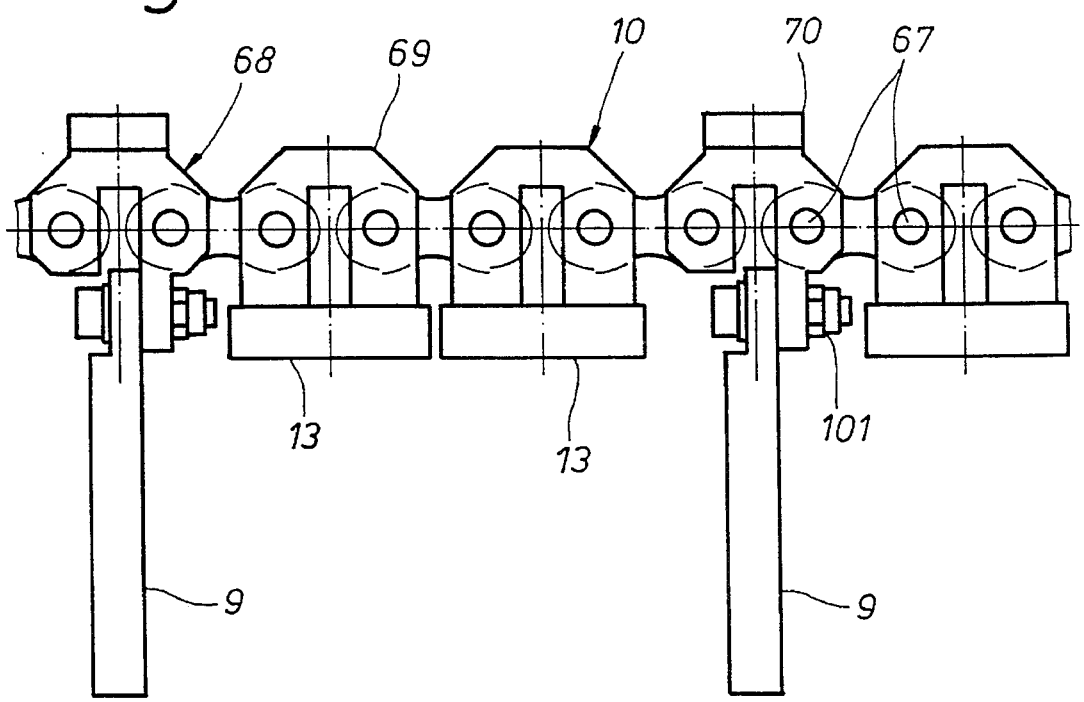
FIG. 8 is a detail taken from FIG. 4, on an enlarged scale.

FIG. 8 shows that both the holder 68 and also the base members 69 are substantially U-shaped in plan view. In the case of the holder 68, one limb of the U-shaped profile is lengthened for the fixing of one of the transportation fingers 9.

Figure 9:
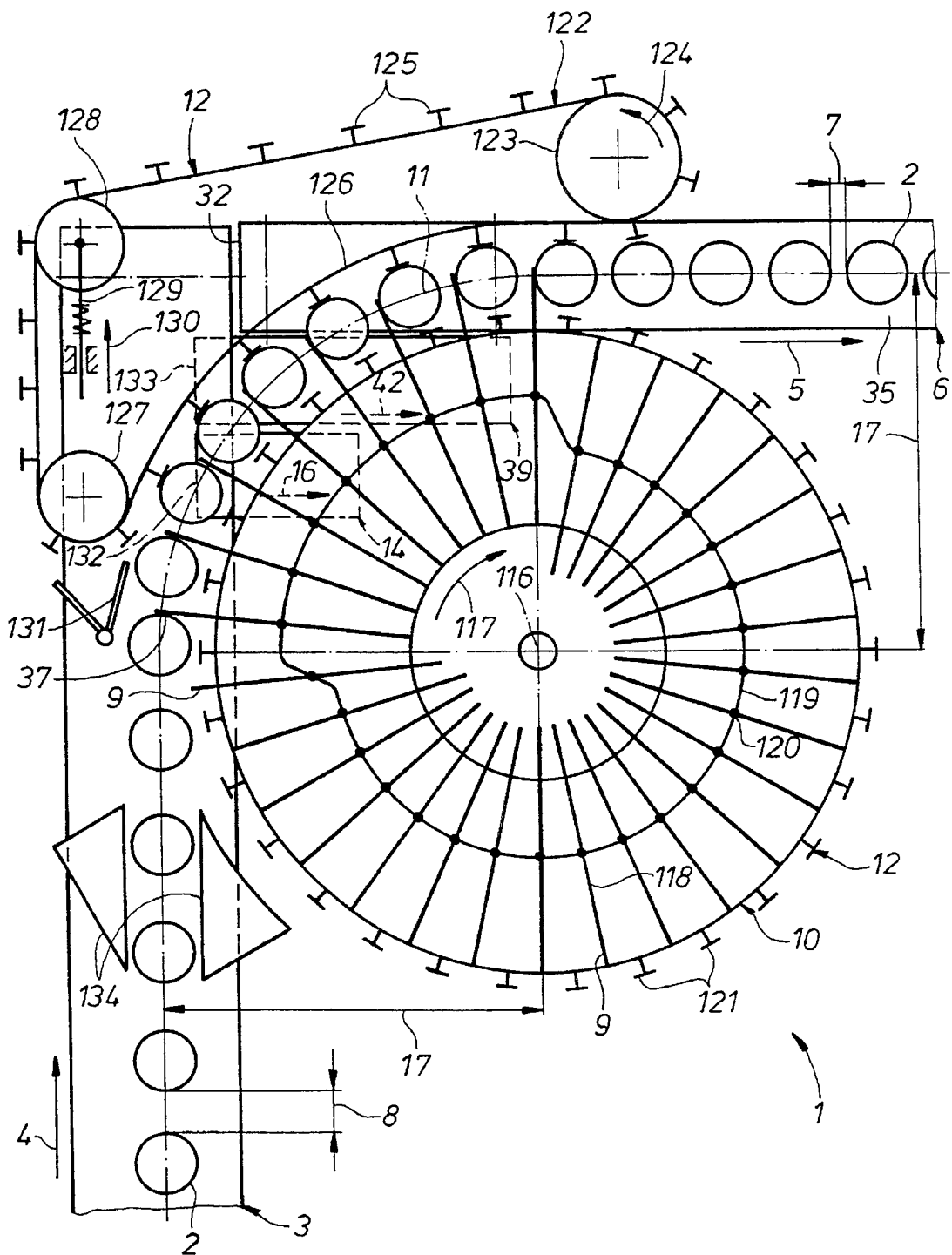
FIG. 9 is the schematic plan view of a further embodiment of the apparatus.

In the embodiment according to FIG. 9 the drive member 10 is formed as a rotary table which can be driven rotatably about a shaft 116. The drive member 10 is normally driven in the direction of the arrow 117 at constant angular velocity. Each transportation finger 9 is arranged on a holder 118 which is mounted for displacement in the radial direction on the drive member 10 and the details of which are visible from FIGS. 11A, 11B and 12.

Each transportation finger 9 is movable, as shown in FIG. 9, outwards at the beginning of the continuously curved path 11 into and inwardly out of the movement path of the containers 2 at the end of the continuously curving path 11. These movements are controlled by a stationary curved track 119 in which a curve roller 120 of each holder 118 engages.

The continuously curved path 11 is in the case of FIG. 9 formed as a quarter circle with the radius 17 about the shaft 116.

In FIG. 9 the support device 12 comprises a support member 121 on the side of the container facing the drive member 10 between successive transportation fingers 9. Several such support members 121 can be provided between successive transportation fingers 9. In the undisturbed normal operation there is preferably a comparatively small radial gap between the support members 121 and the containers 2.

The support device 12 also comprises, in the case of FIG. 9, an endless, flexible drive element 122. The drive element 122 is preferably formed as a roller chain and is driven in the direction of the arrow 124 by means of a rearward deflection wheel 123. The drive element 122 can be formed overall in a manner corresponding to the centering members 47, 56 in FIGS. 4A and 4B. Correspondingly, the drive element 122 is fitted with stopping members 125 whose heat-resisting external surfaces are moved at a speed which corresponds at least approximately to the speed of movement of the containers 2 on the second conveyor belt. A working section 126 of the drive element 122 is guided by a stationary curved track corresponding to the continuously curved path 11. This stationary curved track can correspond to the stationary curved track 95 in FIG. 7. The drive element 122 runs around a forward deflection wheel 127 and an intermediate deflection wheel 128 on which a chain tensioner 129 exerts a tensioning force in the direction of the arrow 130.

In advance of the forward deflection wheel 127 is installed a stationary deflector 131 which feeds in the containers 2 arriving on the first conveyor belt 3 so that they come into contact both with the rearward face 37 of one of the transportation fingers 9 and also with the associated stopping member 125. Each container 2 has contact against its stopping member 125 until the beginning of the deflection of the drive element 122 by the rearward deflection wheel 123.

In the case of FIG. 9, the two intermediate belts 14, 39 are arranged parallel to the second conveyor belt 6 and impart to the containers 2 only a comparatively small drive component in the third and fourth directions of movement 16, 42. These drive components should respectively only be so large that they reduce the contact force of the containers 2 against the stopping members 125 to a nominally small value. Preferably, the drive components of the intermediate belts 14, 39 should however not be so small that the containers come free from the stopping members 125 or even come into contact with the support members 121. The intermediate belts 14, 39 thus here again effect a smooth routing of the containers 2 from the first conveyor belt 3 to the second conveyor belt 6. Deflected ends 132 and 133 of the intermediate belts 14, 39 are, in the same way as FIG. 2, introduced between upper run and lower run of the first conveyor belt 3 in order to avoid any possibility of stationary intermediate plates being necessary for the transition from the first conveyor belt 3 to the intermediate belts 14, 39.

In advance of the deflector 131 there is provided on the first conveyor belt 3 a guard 134 arranged such that containers 2 which are not coming in on the first conveyor belt 3 in the desired position are removed from the first conveyor belt 3. For this, one includes in particular containers 2 which have fallen over or which are particularly off-line.

Figure 10:
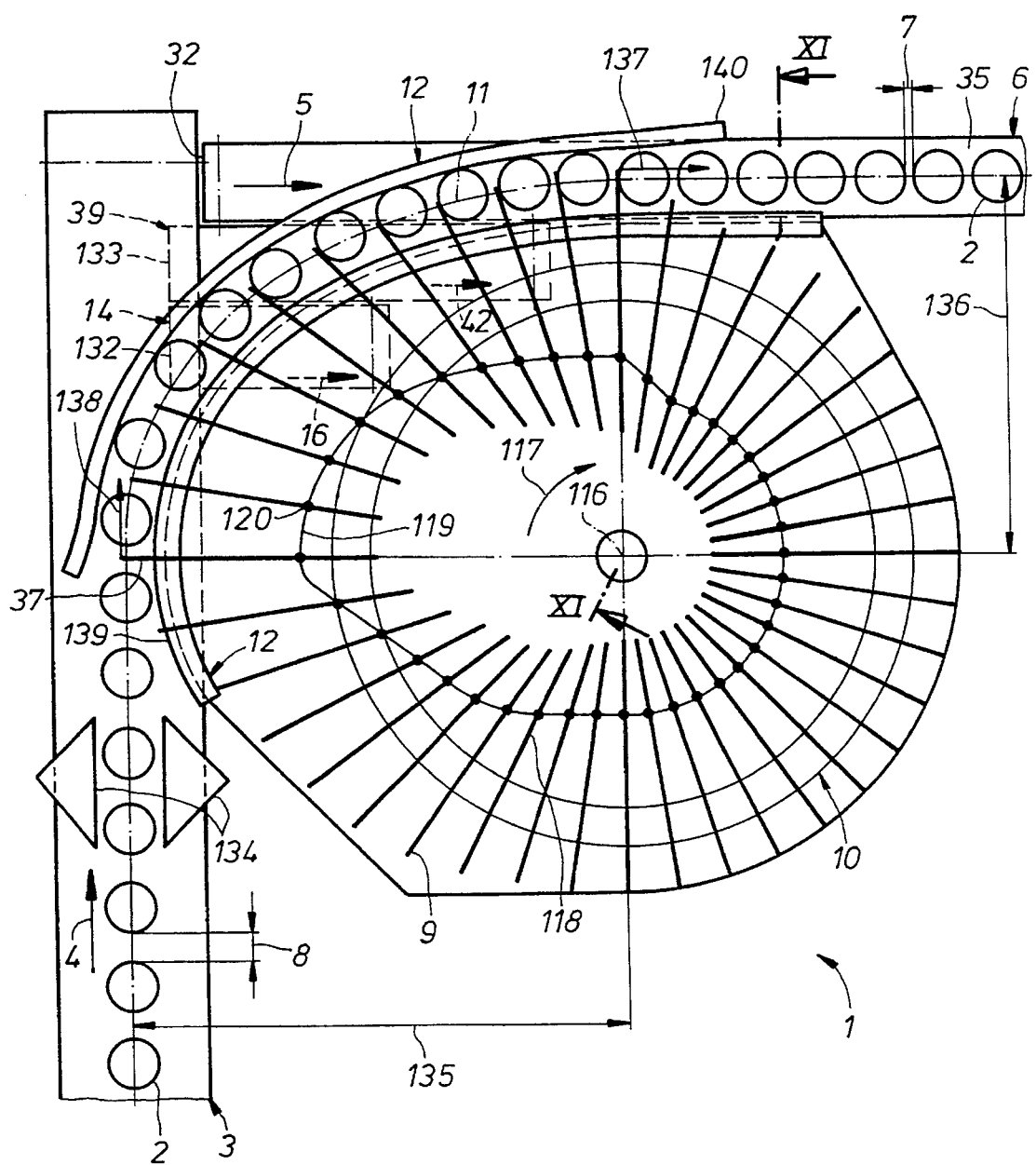
FIG. 10 is the schematic plan view of yet another embodiment of the apparatus.

FIG. 10 shows a further embodiment of the apparatus 1 which in principle is formed similarly to the apparatus 1 shown in FIG. 9. Again in FIG. 10 the drive member 10 is a rotary table. However, in the case of FIG. 10 the continuously curved path 11 is a curved piece having a curvature which continuously decreases in the direction of transportation, and which in this case is an ellipsoidal curved piece.

The long semi-axis 135 and the short semi-axis 136 of this ellipse are indicated in FIG. 10. This configuration of the continuously curved path 11 which deviates from the circular form has the result that the transportation fingers 9 when retracted have a peripheral speed 137 which is at least approximately equal to the transportation speed of the second conveyor belt 6, and the peripheral speed 138 of the transportation fingers 9 when just extended outwards between successive containers 2 is greater than the peripheral speed 137. This brings about the advantage that the containers 2 which are coming in on the first conveyor belt 3—if at all—travel with only comparatively low differential speed towards the rear face 37 of the transportation fingers 9, and thus are only slightly interfered with. By the peripheral speed of the transportation fingers 9 decreasing continuously from the peripheral speed 138 to the peripheral speed 137 one also achieves a very smooth routing of the containers 2. The intermediate belts 14, 39 contribute to this as shown in FIG. 9.

In FIG. 10 the support device on the inside of the containers 2 comprises a support member 139 which is formed as a stationary slide rail extending corresponding to the continuously curved path 11. The support member 139 corresponds in its function and arrangement relative to the containers 2 to the support elements 121 in FIG. 9.

The support device 12 includes additionally in FIG. 10, on the outside of the containers 2, a stationary slide rail 140 extending corresponding to the continuously curved path 11. By means of the slide rail 140 the containers are smoothly guided and routed from the first direction of movement 4 into the second direction of movement 5. Thanks to the intermediate belts 14 and 39 the contact force of the containers against the stationary slide rail 140 can be kept to a minimum. If necessary the stationary slide rail 140 can be replaced by a flexible endless drive member corresponding to the drive member 122 shown in FIG. 9.

Figure 11A:
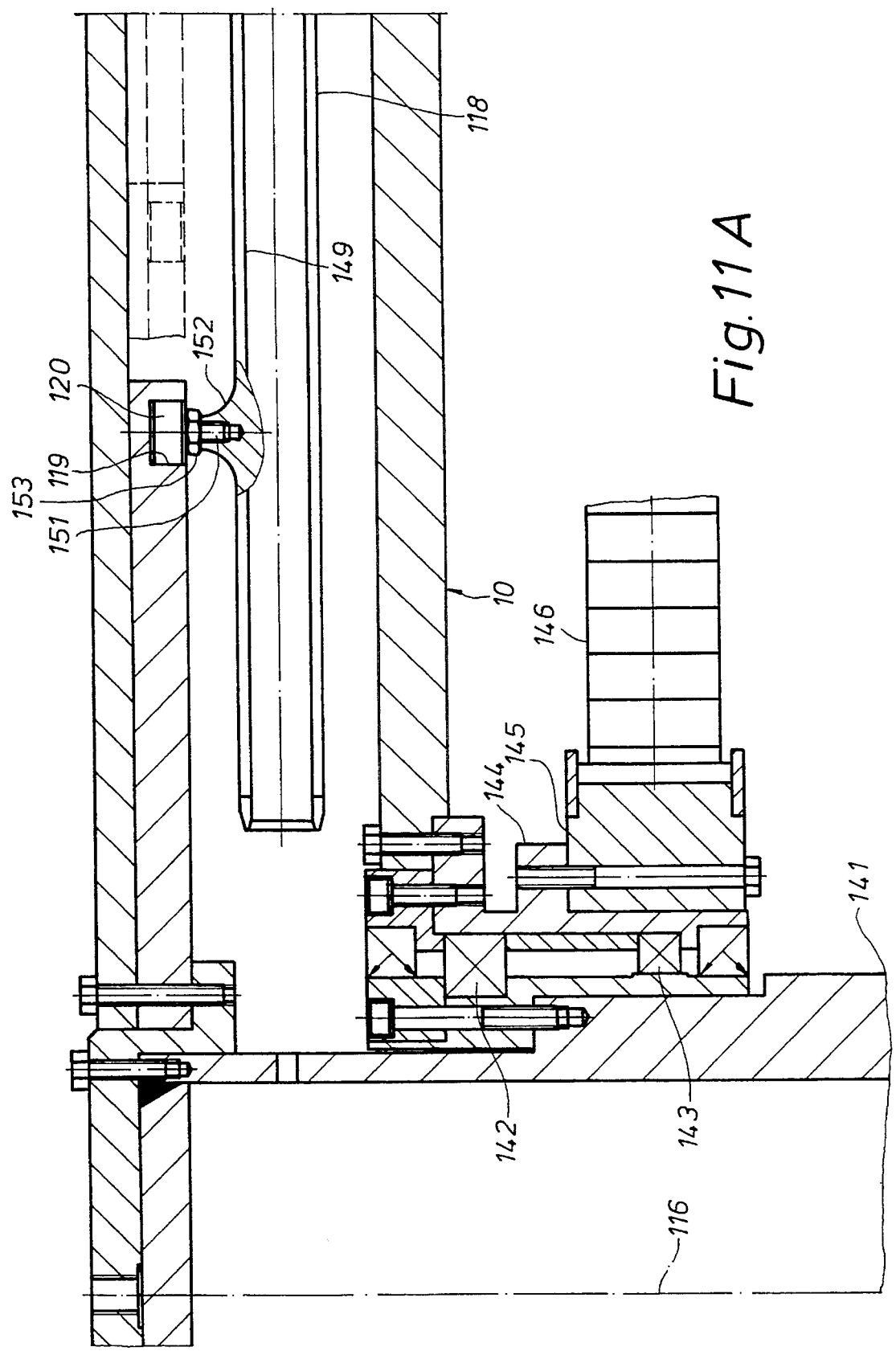

FIGS. 11A and 11B show details of the embodiment of FIG. 10. A stationary carrier tube 141 is arranged coaxially with respect to the shaft 116. A boss 144 is rotatably mounted on the carrier tube 141 by means of rolling bearings 142 and 143 and is driven by a belt 146 by way of a belt wheel 145. The drive member 10 formed here as a rotary table is fixed to the boss 144. The drive member 10 carries on the outside uniformly spaced guide members 147 around the periphery. One of the holders 118 for the transportation fingers 9 is radially displaceably guided in each guide member 147. For this, each guide member has four guide rollers 148 which engage in pairs on opposite sides of the holder 118 in longitudinal channels 149 and 150 (FIG. 12), with the holder 118 here having an I-shaped cross-section. A threaded shaft 151 of the curve roller 120 is screwed into an eye 152 of the holder 118 and is secured there by a lock nut 153.

Figure 12:
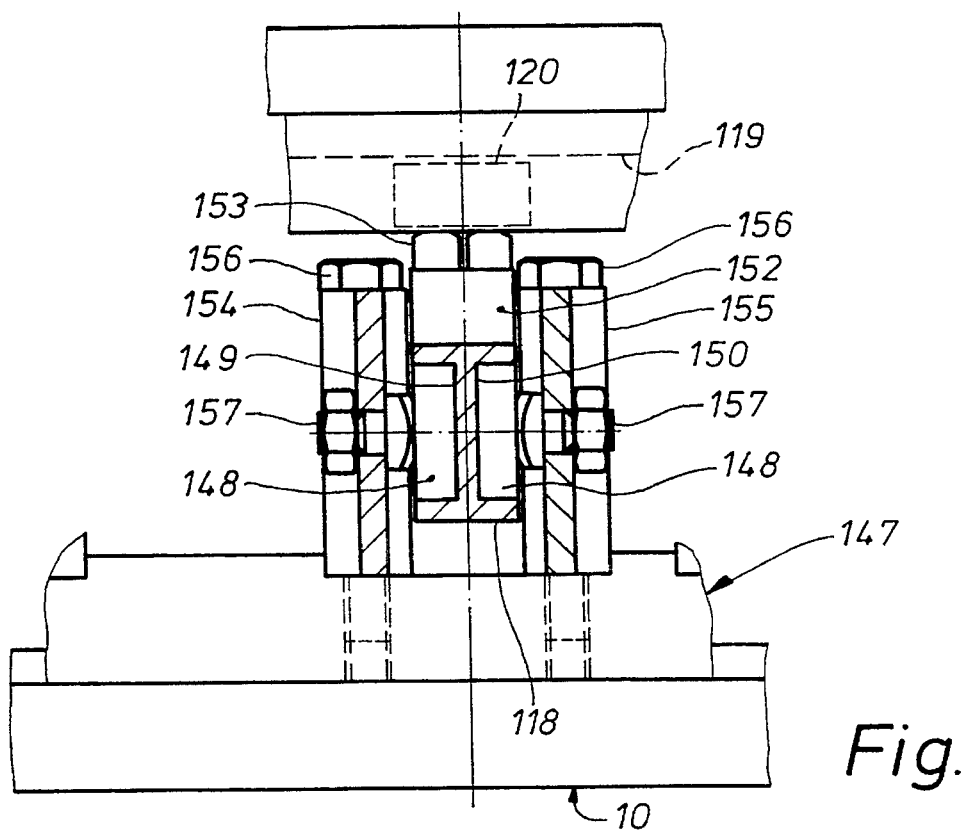
FIG. 12 is the sectional view taken along the line XII—XII in FIG. 11B.

As shown in FIG. 12, the guide member 147 has side plates 154 and 155 which are arranged parallel to each other and spaced from each other by a distance equal to the width of the holder 118. They are secured by screws 156. The two associated guide rollers 148 are fixed by screws 157 to each side plate 154, 155.

Changes and modifications in the specifically described embodiment can be carried out without departing from the scope of the invention which is intended to be limited only by the scope of the appended claims.

What is claimed is:

1. Apparatus for the routing of containers of glass, glass-like material or plastics material arriving on a first conveyor belt in a row at a comparatively high, first speed to a second conveyor belt running at a lower, second speed and at an angle to the first conveyor belt, wherein the second conveyor belt carries the containers away in a row, said apparatus comprising:

transportation fingers for routing each container;

a common drive member on which said transportation fingers are arranged for moving said fingers;

wherein said transportation fingers are guided on a continuously curved path during the routing of the containers from the first to the second conveyor belt, said curved path being concave relative to the containers;

support means for maintaining each container on said continuously curved path;

at least one intermediate belt arranged in said continuously curved path between the first conveyor belt and the second conveyor belt for taking control of each container along part of said continuously curved path; and wherein each said intermediate belt, said first conveyor belt and said second conveyor belt each have an upper run, said upper run of each said intermediate belt being approximately co-planar with the upper runs of the first and second conveyor belts and drivable in a direction so as to impart to the containers a driving component in a direction toward said drive member.

2. Apparatus according to claim 1 comprising a plurality of intermediate belts drivable with decreasing speeds in the direction from the first conveyor belt to the second conveyor belt.

3. Apparatus according to claim 1 or 2 wherein the drive for said at least one intermediate belt is derived from one of the first and second conveyor belts.

4. Apparatus according to claim 1 having plurality of belts which includes said first, said second and said at least one intermediate belt, each of said first, second and intermediate belts being adjacent at least one other said belt, add wherein a gap which is bridgeable by the containers themselves is provided between adjacent said belts.

5. Apparatus according to claim 1 having plurality of belts, which includes said first, said second and said intermediate belt wherein at least one said belt is adjacent and at an angle to another said belt and having a deflected end extending between an upper and a lower run of said adjacent belt to minimize a gap between these belts.

6. Apparatus according to claim 1 further comprising:

an endless flexible first centering member positioned at the forward end of said common drive member to center the containers arriving on the first conveyor belt onto a first predetermined line for the receipt of the containers by said transportation fingers;

wherein said first centering member is guided and drivable by means of deflection wheels having at least approximately vertical axes, and wherein said first centering member has a working section contacting the containers and which runs parallel to the first predetermined line and at least approximately in the direction of movement of an upper run of the first conveyor belt.

7. Apparatus according to claim 6 wherein said first centering member is drivable at a speed from the circulating speed of the first conveyor belt up to the speed of movement of the support means.

8. Apparatus according to claim 1 further comprising a guard arranged on the first conveyor belt so as to remove containers which are not in the desired position when arriving on the first conveyor belt.

9. Apparatus according to claim 1 wherein said at least one intermediate belt extends parallel to the first conveyor belt.

10. Apparatus according to claim 1 wherein said common drive member is endless and flexible, and said apparatus further comprises a rearward deflection wheel for the common drive member arranged at a delivery end of said continuously curved path.

11. Apparatus according to claim 10 wherein said rearward deflection wheel is rotatably drivable.

12. Apparatus according to claim 10 further comprising:

a forward deflection wheel of minimum diameter positioned at an input end of said continuously curved path; and at least one intermediate deflection wheel for said common drive member positioned at the side of said drive member remote from the containers.

13. Apparatus according to claim 12 wherein said intermediate deflection wheel is adjustable for changing the tension of the drive member.

14. Apparatus according to claim 12 wherein the diameter of the rearward deflection wheel is many times greater than the diameter of the forward deflection wheel, and the support means contacts the containers at the beginning of the deflection of the drive member by the rearward deflection wheel.

15. Apparatus according to claim 10 wherein said support means is arranged spaced from the containers at the beginning of the deflection of the drive member by the rearward deflection wheel.

16. Apparatus according to claim 15 further comprising:

an endless flexible second centering member arranged at the input end of the second conveyor belt to center the containers thereon on a second predetermined line;

said second centering member being guided and drivable by means of deflection wheels which have approximately vertical axes; and a working section of the second centering member contacting the containers and running substantially parallel to the second predetermined line and in the direction of movement of the containers on the second conveyor belt.

17. Apparatus according to claim 16 wherein said second centering member is drivable at least at the approximate speed of movement of the second conveyor belt.

18. Apparatus according to claim 1 wherein said support means comprises at least one stopping member for the containers fixed to the drive member and arranged between successive transportation fingers.

19. Apparatus according to claim 1 wherein said at least one intermediate belt extends parallel to the second conveyor belt.

20. Apparatus according to claim 1 wherein said drive member is formed as a rotatably drivable rotary table, each said transportation finger is held movably on the rotary table so as to move outwardly into the path of movement of the containers at the beginning of the continuously curved path and inwardly out of the path of movement of the containers at the end of the continuously curved path, and the support means is arranged on the side of the containers remote from the rotary table at least along the initial part of the continuously curved path when the containers are still in contact with the first conveyor belt.

21. Apparatus according to claim 20 wherein each said transportation finger is arranged on a holder which is displaceably mounted on the rotary table.

22. Apparatus according to claim 21 wherein each said holder includes a curve roller which travels in a stationary curved track for the displacement.

23. Apparatus according to claim 20 wherein said continuously curved path represents part of a circle.

24. Apparatus according to claim 20 wherein said continuously curved path has a curvature which decreases continuously in the direction of conveyance.

25. Apparatus according to claim 20 wherein said support means comprises an endless flexible drive member, and a working section of said flexible drive member is guided according to the continuously curved path.

26. Apparatus according to claim 20 wherein said support means includes a stationary slide rail extending in accordance with the continuously curved path.

27. Apparatus according to claim 20 wherein said support means includes at least one support member on the side of the containers facing the rotary table, and said at least one support member and the containers have a comparatively small spacing from each other in the undisturbed normal operation.

28. Apparatus according to claim 27 wherein said at least one support member is formed as a stationary slide rail.

29. Apparatus according to claim 27 wherein each said support member includes at least one stopping member fixed to the rotary table between successive transportation fingers.

30. Apparatus according to claim 1 wherein each said transportation finger is arranged perpendicular to the associated external contour of the drive member.

31. Apparatus according to claim 1 wherein said common drive member is drivable at such a speed that the transportation fingers at the delivery of the containers to the second conveyor belt move with a speed which is equal to or somewhat smaller than the speed of movement of the second conveyor belt.

32. Apparatus according to claim 1 wherein said common drive member for the transportation fingers has a working section, said working section being guided in the region of the continuously curved path by a stationary curved track.

33. Apparatus according to claim 25 wherein said working section of said endless flexible drive member is guided in the region of said continuously curved path by a stationary track.

* * * * *

UNITED STATES PATENT AND TRADEMARK OFFICE
CERTIFICATE OF CORRECTION

PATENT NO. : 5,501,316
DATED : March 26, 1996
INVENTOR(S) : Hermening et al.

It is certified that error appears in the above-indentified patent and that said Letters Patent is hereby corrected as shown below:

Claim 4, line 49, insert --a-- after "having";

Claim 4, line 52, delete "add" and insert --and-- therefor; and

Claim 5, line 55, insert --a-- after "having".

Signed and Sealed this

Twenty-fifth Day of February, 1997

Attest:

BRUCE LEHMAN

*Attesting Officer*     *Commissioner of Patents and Trademarks*